United States Patent [19]

Szymber

[11] 4,151,651

[45] May 1, 1979

[54] COAXIAL DUAL DIAL RESETTABLE INDICATOR

[75] Inventor: Oleg Szymber, Palos Verdes, Calif.

[73] Assignee: Primus Mfg., Inc., P.R.

[21] Appl. No.: 870,269

[22] Filed: Jan. 18, 1978

[51] Int. Cl.² .......................... G01B 3/12; G01D 7/00; G09F 9/00

[52] U.S. Cl. .............................. 33/125 M; 33/141 R; 33/147 R; 33/172 R; 116/300; 116/DIG. 47

[58] Field of Search ................ 33/141 R, 125 M, 166, 33/172 R, 147 R; 116/129 E, 129 F, DIG. 47

[56] References Cited

U.S. PATENT DOCUMENTS

| | | | |
|---|---|---|---|
| 2,881,527 | 4/1959 | Walter et al. | 33/172 R |
| 3,378,929 | 4/1968 | Deardorff et al. | 33/125 M |
| 3,813,792 | 6/1974 | Jarvenpaa | 33/356 |

*Primary Examiner*—Steven L. Stephan
*Attorney, Agent, or Firm*—Christie, Parker & Hale

[57] ABSTRACT

A fully adjustable concentric dial indicator comprises a first annular scale member which is adapted to carry indicia around the periphery thereof defining a first circular scale. The second scale member is disposed coaxially of the first and is adapted to carry indicia around the periphery thereof defining a second circular scale. Friction clutch means couple the scale members to a support for selective rotation of the scale members relative to the support in either direction about the common axis. The friction clutch means includes a manually engageable ring member to which only the first of the scale members is fixed and which is rotatable about the common axis of the scale members against the effect of the friction clutch means associated with the first scale member. First and second concentric rotatable shafts are aligned with the axis and respectively carry first and second pointers. The pointers cooperate, in response to rotation of the shafts, with scales definable on the respective ones of the scale members. A projection extends inwardly toward the axis from the ring member. A finger is coupled to the second scale member and extends outwardly therefrom into the path along which the projection moves in response to rotation of the ring member about the indicator axis.

11 Claims, 4 Drawing Figures

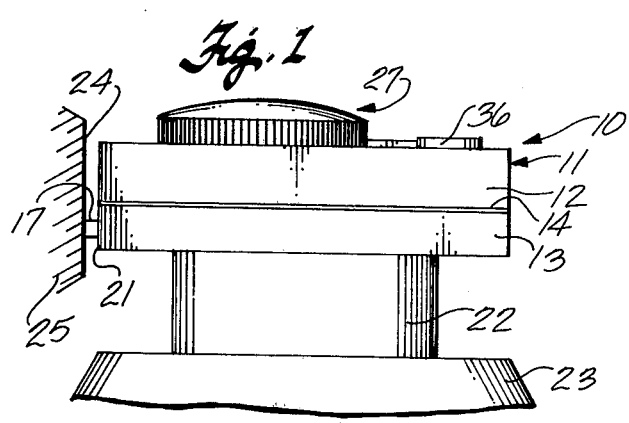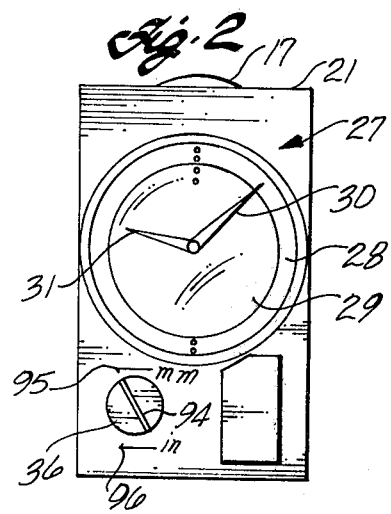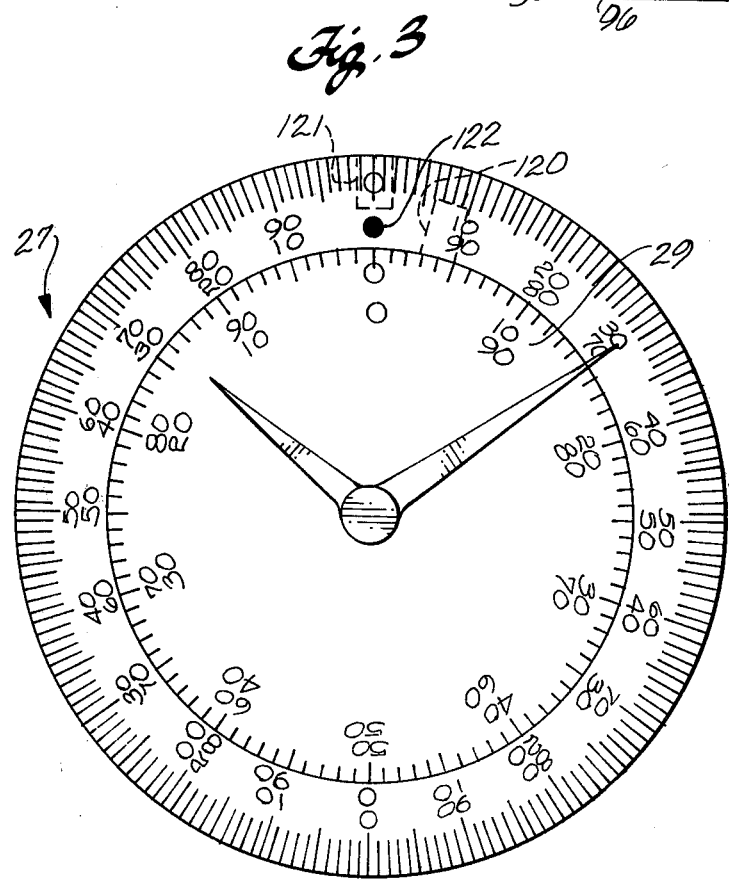

COAXIAL DUAL DIAL RESETTABLE INDICATOR

BACKGROUND OF THE INVENTION

1. Field of the Invention

This invention pertains to dial indicators. More particularly, it pertains to such indicators in which two concentric dials cooperate with coaxially driven scale pointers, and in which both dials are angularly adjustable about the pointer axes for presetting, calibration or zeroing of scales on the dials relative to the pointers in any position of the pointers.

2. Review of the Prior Art

Concentric scale dial indicators, in which each dial scale cooperates with a reference member, are known in various applications. Such indicators may be found, for example, in machine tools where concentric rotary dials cooperate with fixed reference members. The dials rotate at different rates as determined by appropriate gearing coupled to a leadscrew in the machine tool. The dials may cooperate with a common stationary reference member or with separate fixed reference members, such as pointers. Usually such indicators have no adjustment capability enabling them to be set to zero or to some specified indication independently of the state of things in the machine tool.

In machine tools, such indicators indicate the distance of travel of one tool part (such as a lathe carriage) along another part (such as a lathe bed) relative to a base or zero position of the carriage on the bed. Typically, one dial indicates such travel in inches and tenths of inches, and a second dial indicates hundredths and thousandths of inches of travel. This proves to be inconvenient and a source of error in many cases. In a complex machining operation, the machinist may desire to move the carriage a desired distance from a first carriage position (not the base position) to a second position (not the base position). To do this correctly, he must ascertain or separately compute the difference between the indicator readings at the two different carriage positions, and then add or subtract that difference to or from the reading for the first position to determine when he has moved the carriage to the second position. Such arithmetic operations are time consuming and mistakes may be made. It would be quicker and more accurate, with the carriage at the first position, to zero or preset the indicator to the known distance of travel, and then move the carriage until it reads either the desired distance or zero, respectively. This cannot be done where the dials are not separately adjustable independently of the leadscrew.

In other applications, concentric dial, rotary pointer indicators are known. In such indicators, two or more concentric circular dials cooperate with corresponding ones of a plurality of coaxially driven rotary pointers. In such indicators, only the outermost dial has been adjustable or prepositionable relative to the pointer.

The present invention currently is provided in the context of a friction wheel measuring device which has significant utility as a measuring accessory for machine tools. U.S. Pat. Nos. 3,311,985 and 3,378,929, for example, owned by the assignee of this invention, pertain to such measuring devices. In the device of U.S. Pat. No. 3,311,985, three dials are provided to give the desired overall indication; only the third and finest reading dial is adjustable; the other two could be preset or zeroed only by disengaging the metering wheel from the surface along which it rolled. In the device of U.S. Pat. No. 3,378,929, the indicators are fully adjustable for zeroing or presetting thereof, but the overall indicator is divided into two separate parts having two spaced axes about which corresponding circular dials are separately adjustable; the metering wheel does not have to be disengaged from its measurement surface. Improvements in these measuring devices have made it possible for them to be made smaller, but at the same time the visual indicators should be as large as possible for ease of reading by the user.

A dual concentric dial indicator, having coaxially driven rotary pointers, is a good indicator for use in the smaller measuring devices because such an indicator can be large relative to the device. However, the problem then becomes one of how to provide full adjustability of the indicator for complete zeroing or presetting of the indicator. It will be apparent, however, that the problem of full adjustability of dual or multiple concentric dial indicators can arise in mechanisms other than friction wheel measuring devices. It is this general problem to which this invention is addressed.

SUMMARY OF THE INVENTION

This invention provides a simple efficient and economic solution to the problem identified above. The presently preferred application and utility of the invention is in the context of friction wheel measuring devices, but it will be appreciated that the invention has utility and areas of application different from friction wheel measuring devices. This invention provides a coaxial dual dial indicator which is fully resettable so that the indicator may be set to zero or preset to any desired reading at any time independently of the drive mechanism coupled to the indicator input.

Generally speaking, this invention provides a fully adjustable concentric dial indicator which includes first and second scale members. The first scale member is annular, whereas the second scale member is circular. The scale members are disposed coaxially of each other and are each adapted to carry indicia around the periphery thereof defining first and second circular scales on the respective scale members. Friction clutch means couple the scale members to a support for selective rotation of the scale members relative to the support in either direction about their common axis. The friction clutch means include a manually engageable ring member to which only the first of the scale members is fixed. The ring member is rotatable about the axis against the effect of the friction clutch means associated with the first scale member. First and second concentric rotatable shafts are aligned with the axis and respectively carry first and second pointers; the pointers cooperate, in response to rotation of the shafts, with scales definable on the respective ones of the scale members. A projection extends in one direction relative to the axis from the ring member. A finger is coupled to the second scale member and extends in the opposite direction relative to the axis from the second scale member into the path along which the projection moves in response to rotation of the ring member about the indicator axis.

This structure enables the indicator to be adjusted, i.e., zeroed or preset to any desired reading, by a user manually engaging the ring member and rotating the same. As the ring member is rotated against the bias of its friction clutch, the projection carried by the ring member is moved into engagement with the finger coupled to the second scale member. Continued rotation of the ring member causes the second scale member to be driven about its axis against the bias of the friction clutch means for the second scale member. This operation is continued until the second scale member is disposed in a predetermined relation to the second pointer. The ring member is then rotated in the opposite direction until the first scale member has a predetermined relationship to the first pointer. As soon as rotation of the ring member in the opposite direction is commenced, the finger and projection disengage from each other and the second scale member is held in its adjusted position by the friction clutch means associated with that scale member. Once the first scale member has been adjusted to its desired position, the friction clutch associated with the first scale member holds that member in its adjusted position.

DESCRIPTION OF THE DRAWINGS

The above-mentioned and other features of this invention are more fully set forth in the following detailed description of the presently preferred embodiment of the invention, which description is presented with reference to the accompanying drawings, wherein:

FIG. 1 is an elevation view of a friction wheel measuring device which provides the preferred environment and utility of this invention;

FIG. 2 is a top plan view of the measuring device shown in FIG. 1;

FIG. 3 is an enlarged plan view of the indicator of the measuring device shown in FIGS. 1 and 2.

DESCRIPTION OF THE ILLUSTRATED AND PRESENTLY PREFERRED EMBODIMENT

Figure 4:
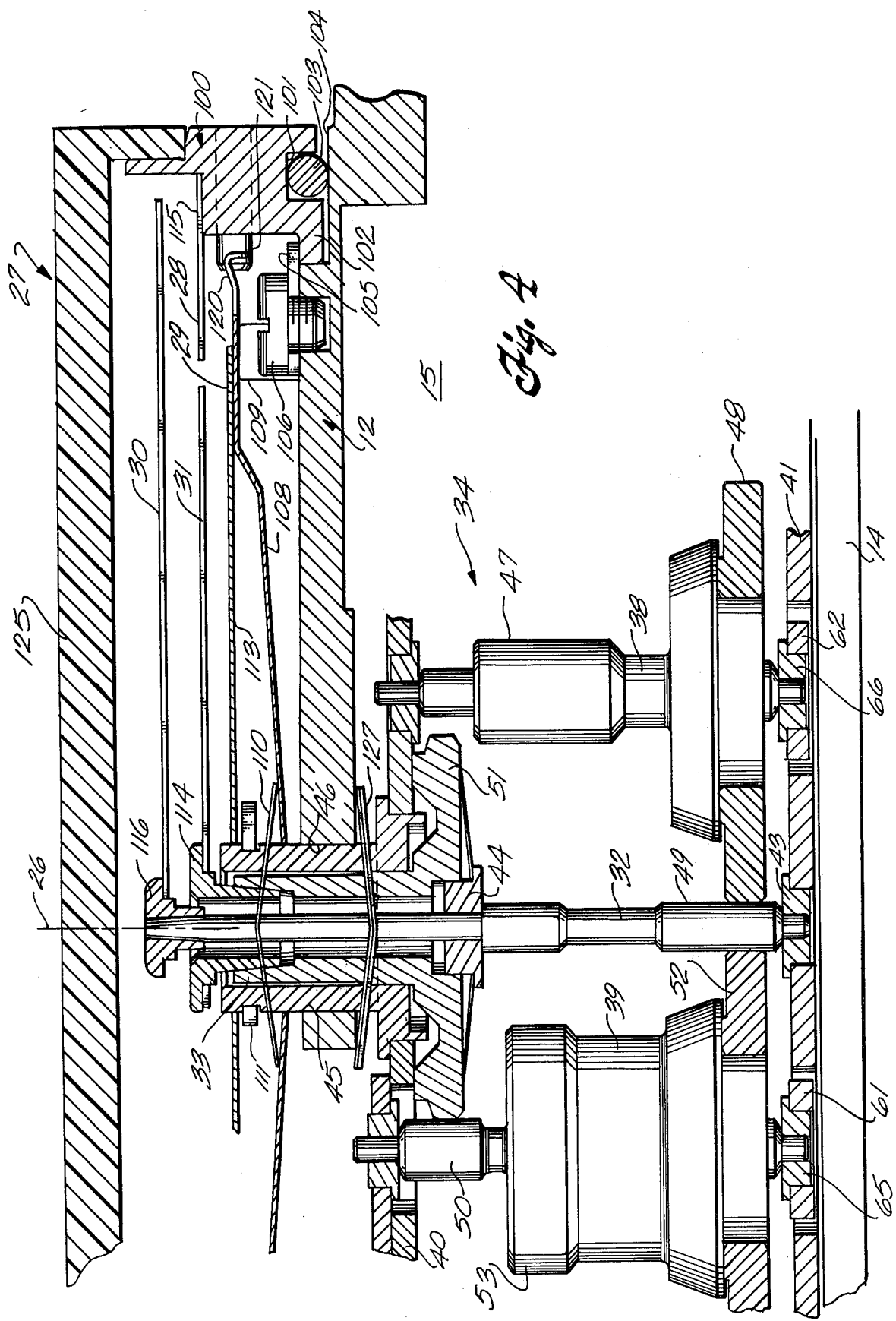
FIG. 4 is an enlarged fragmentary cross-sectional elevation view of the indicator and a portion of the internal mechanism of the measuring device which is intimately associated with the indicator.

The presently preferred application for and utility of this invention is in a friction wheel measuring device 10, as shown in FIG. 1. The measuring device preferably is of the type of which U.S. Pat. Nos. 3,311,985 and 3,378,929 are descriptive. More preferably, the measuring device is also in accord with the description of copending commonly owned application Ser. No. 870,466, filed Jan. 18, 1978, in that the measuring device is arranged for making measurements in either one of two alternative measurement systems (such as inches and millimeters or centimeters) depending upon the operative state of an actuator 36 for a mode selector mechanism defined within the measuring device. The details of the measuring device which enable it to be switched between measurement systems, i.e., English and metric measurement systems, are described and illustrated in the copending application.

Measuring device 10 includes a housing 11 composed of an upper part 12, a lower part 13 and an intermediate plate 14. The housing defines an upper chamber 15 (see FIG. 4) and a lower chamber on opposite sides of intermediate plate 14. A metal metering wheel 17 of precisely predetermined circumferential extent is fixed upon a wheel shaft (not shown). The wheel shaft is rotatably supported in thrust and journal bearings within the housing. Metering wheel 17 is disposed within the housing lower chamber, but the wheel shaft extends into the upper chamber where it carries a gear (not shown) which comprises the main drive gear for an internal motion amplifying gearing 34 located within the housing upper chamber and coupled to a visual indicator 27 according to this invention. The wheel shaft axis is fixed relative to housing 11. The rim of the metering wheel projects through an opening in a front face 21 defined by the lower housing part.

Measuring device 10 has many uses and many different applications. A typical use of the measuring device is in the context of a machine tool where the device is relied upon to make accurate measurement of the distance which one part of a machine tool moves along a predetermined path relative to another part of the tool. For example, as shown in FIG. 1, measuring device 10 is connected by a resiliently biased, wheel loading mounting mechanism 22 to a lathe carriage 23, for example, so that the rim of metering wheel 17 engages and rolls along in machined surface 24 (a measurement surface) defined by the lathe bed 25 for example. Mounting mechanism 22 preferably is of the type of which U.S. Pat. No. 3,844,044 is descriptive; alternatively, the mounting mechanism may be defined in accord with the teachings of U.S. Pat. Nos. 3,740,856 or 3,724,082. In any event, the mounting mechanism incorporates a resilient bias which, in view of the cooperation between the mounting mechanism and device 10, is effective to forceably urge the rim of metering wheel 17 into contact with measurement surface 24. As a result, as lathe carriage 23 moves relatively along lathe bed 25, the metering wheel rolls faithfully along the measurement surface, without slippage, to sense the actual distance of travel of the carriage along the lathe bed.

An adjustable indicator 27, according to this invention, is mounted to the upper portion of the measuring device to be visually observable by a user of the device. The indicator preferably includes dual concentric circular dials 28 and 29, each carrying on its upper face adjacent to its periphery indicia defining a circular scale. A pair of rotary pointers 30 and 31 cooperate with respective ones of the circular scales and are mounted on respective ones of concentric drive shafts 32 and 33 (see FIG. 4) which are driven by the motion amplifying gearing 34. Shafts 32 and 33 may be considered as either indicator input shafts or gearing output shafts.

As shown best in FIG. 3, the scales of dials 28 and 29 are themselves dimensionless. Dial 29 contains two scales having a common origin; the two scales are subdivided into 100 parts and proceed in opposite directions around the dial from the common origin. Outer dial 28 has its periphery divided into 200 regularly spaced increments by appropriate indicia. The major indicia on dial 28 are associated with each tenth increment and are in two sequences, one proceeding clockwise of the dial and the other proceeding counterclockwise of the dial; in each sequence the indicia are by tens from 0 to 90, two times, in series. The scale on the inner dial represents units and multiple units of measure, whereas the scale on the outer dial represents decimal fractions of a unit.

As more fully set forth in the above-identified copending application, gearing 34 is arranged to define two different gear ratios between metering wheel 17 and the indicator input shafts, depending upon the state of mode selector actuator 36 (see FIG. 1). The difference between these gear ratios as reflected at indicator 27 corresponds to the conversion factor between the two different different units of measure in which the measuring device can make and display measurements made by it. In measuring device 10, these different units of measure are English and metric units, i.e., inches and millimeters. When the mode selector actuator is operated to its millimeter position, as shown in FIG. 2, the scale on dial 29 represents millimeters and tens of millimeters of travel of the metering wheel along measurement surface 24, and scale 28 represents tenths and hundredths of a millimeter of such travel. When the selector actuator is in its inch position, as indicated at 96 in FIG. 2, the scale on dial 29 indicates inches and tenths of inches of travel, and the scale on dial 28 represents hundredths and thousandths of inches of travel of the metering wheel along the measurement surface. Thus, indicator 27 is dimensionless in nature and has significance in terms of the units of measure selected by the state of actuator 36.

The gearing within measuring device housing 11 is partially illustrated in FIG. 4. All of the gearing of the measuring device is disposed in housing upper chamber 15. Housing intermediate plate 14 functions as a chip exclusion plate to prevent fluids and metal chips, which may enter the housing lower chamber through the opening through which the rim of the metering wheel projects, from passing into the housing upper chamber 20 and contaminating the precision motion amplifying gearing 34. The metering wheel shaft and the main drive gear carried thereby are not shown in FIG. 4, but all other components of gearing 34 are shown in FIG. 4.

Gearing 34 includes four shafts 32, 33, 38, and 39, all of which are disposed entirely in the housing upper chamber. These shafts are rotatably supported in top and bottom plates 40 and 41 respectively in a gear cage 42 which is angularly movable in the housing upper chamber about indicator axis 26 in response to the operation of the mode selector mechanism as determined by the state of actuator 36. Shafts 32 and 33 are coaxial input shafts to indicator 27. Shafts 38 and 39 are intermediate shafts in gearing 34 and, in view of the functions which they serve, are appropriately referred to as metric and English shafts of the gearing. The metric and English shafts are alternately engageable in a more intimate relation than the other with the metering wheel shaft. That is, when the measuring device is operated in its metric measurement mode, shaft 38 is more intimately related to the metering wheel shaft than is the English shaft; when the device is operated in English metric mode, shaft 39 is more intimately related to the metering wheel shaft than is shaft 38.

Inner indicator input shaft 32 rotates about axis 26 which is fixed relative to gear cage 42. Shaft 32 has its lower end engaged in a bearing 43 mounted in the gear cage bottom plate. Adjacent its upper end, shaft 32 passes through a bearing 44 which is carried in a recess in an axial bore of outer indicator input shaft 33. Shaft 33 is in turn rotatably mounted in a sleeve 45 which is fixed to carriage top plate 40. Sleeve 45 cooperates rotatably in an aperture 46 formed in housing top part 12 essentially coaxially of indicator 27. The cooperation between the sleeve and aperture 46 defines the pivot axis for angular motion of the gear cage relative to the housing.

In a presently preferred embodiment of this invention, metering wheel 17 has a circumference of six inches. Gearing 34 is arranged so that one full traverse of inner dial pointer 31 around dial 29 corresponds to either ten inches or ten centimeters of travel of the metering wheel along the measurement surface, depending upon the operative state of the mode selector mechanism. The gearing is arranged so that one full traverse of longer dial pointer 30 about dial 28 corresponds to 0.2 inch or 2 millimeters of travel of the metering wheel. The overall gear ratio of gearing 34 for English measurement is therefore 1:30, or one full rotation of the inner indicator shaft (which carries outer pointer 30) for 0.2 of an inch of travel of the six inch circumference metering wheel. The overall gear ratio of gearing 34 when the mode selector is in its metric position is 1:76.2 or one full rotation of inner shaft 32 for two millimeters of travel of the six inch circumference metering wheel. The ratio between these gear ratios is 2.54 which is the conversion factor between centimeters and inches.

As shown in FIG. 4, metric shaft 38 carries a small diameter gear 47 adjacent its upper end, and a larger diameter gear 48 adjacent its lower end. Gear 48 is always meshed with a pinion gear 49 carried by the lower end of inner indicator input shaft 32. English shaft 39 carries three gears, namely, (1) a small diameter output gear 50 which is always meshed with a larger diameter gear 51 carried (preferably integrally) on the lower end of outer indicator input shaft 33, (2) a large diameter gear 52 which is always meshed with gear 49 and (3) an intermediate diameter input gear 53 between gears 50 and 52. Gears 47 and 53 are alternate input pinion gears in that portion of gearing 34 which is carried by gear cage 42. Gear 47 may be considered as a metric input gear, whereas gear 53 may be considered as an English input gear. Gears 47 and 53 cooperate alternately with the main drive gear, carried by the shaft to which gearing wheel 17 is mounted, depending upon the operative state of the mode selector mechanism.

In a preferred embodiment of the measuring device to which FIG. 4 pertains, the gear 49 has 15 teeth, gear 52 has 120 teeth, gear 50 has 12 teeth, and gear 51 has 75 teeth. These four gears are always meshed with each other in the manner shown in FIG. 4. Accordingly, indicator shaft 32 always rotates 50 times for each rotation of shaft 33, regardless of the operative state of the mode selector mechanism. The necessary conversion factor between English and metric units is defined by the difference between the effective gear ratios between the main drive gear and the inner indicator input shaft via gears 47 and 48 on the one hand and via gears 52 and 53, on the other hand.

The axes of shafts 38 and 39 are essentially fixed relative to indicator 27. As noted above, the gear cage 42, in which shafts 38 and 39 are mounted, is angularly movable in the measuring device about the indicator axis to enable gears 47 and 53 to be moved alternately into meshing relation with the main drive gear. Thus, the positions of the axes of shafts 38 and 39 are changeable within the measuring device, but are fixed relative to each other and relative to the indicator axes.

Gear cage 42 is supported upon the upper surface of housing intermediate plate 14.

The gearing arrangement shown in FIG. 4 is not a part of this invention, but is described and illustrated as it is the presently preferred drive mechanism for indicator shafts 32 and 33. It will therefore be appreciated that it is within the scope of this invention that indicator shafts 32 and 33 can be driven about indicator axis 26 in any manner desired.

Indicator 27 is a resettable indicator in that it can be adjusted, for zeroing or presetting to any desired measurement, at any time desired by a user. The indicator may be preset or zeroed without requiring disengagement of metering wheel 17 from measurement surface 24. To enable this reset or preset operation to be accomplished, indicator dials 28 and 29 are separately frictionally clutched to housing 11 for rotation by the user in either direction about axis 26 against the drag forces provided by the friction clutches.

As shown best in FIG. 4, indicator 27 includes an annular ring member 100 which serves as a bezel in the indicator. The bezel has a downwardly opening recess 101 in its lower face and a radially inwardly extending flange 102 around its inner circumference. An O-ring 103 is disposed in bezel recess 101 to bear against a top surface 104 of housing top part 12. The bezel is resiliently biased downwardly toward surface 104 by a plurality of bezel retainer springs 105 which are secured by screws 106 to the housing inside the annulus of the bezel. The exterior of the bezel is manually engageable so that it can be rotated against the friction provided (1) by the compression of the O-ring between the bezel and housing surface 104 and (2) between the upper surface of flange 102 and bezel retainer springs 105.

A centrally dished, inner dial carrier 108 is disposed concentrically of sleeve 45 between the sleeve and the bezel. Adjacent its perimeter, the lower surface of carrier 108 engages a plurality of support posts 109 which extend upwardly from the housing top part inwardly of the bezel at suitably spaced locations about the circumference of sleeve 45. Inner dial carrier 108 is urged downwardly against spacer posts 109 by a resilient wave washer 110. The wave washer is engaged circumferentially of sleeve 45 between the upper surface of the carrier and a retainer ring 111 engaged with the exterior of the sleeve above the wave washer. The wave washer reacts between the retainer ring and the inner dial carrier to apply a downward force to the carrier. Sleeve 45, in turn, is biased downwardly relative to housing 11 against the gear cage top plate by a set 127 of wave washers engaged circumferentially of the sleeve between the underside of housing top part 12 and a radial flange on the lower end of the sleeve via which the sleeve engages the gear cage top plate. The downward force applied to the sleeve by washer set 127 is greater than the upward force applied to the sleeve by washer 110. Thus, dial carrier 108 is effectively frictionally clutched to the housing at posts 109.

Inner scale 29 is defined along the outer upper margin of a circular inner scale plate 113 which is connected, as by gluing, to the outer portions of carrier 108. Pointer 31 is connected to outer indicator input shaft 35 by an axially bored coupling hub 114 through which inner indicator input shaft 32 extends as shown in FIG. 4. The outer indicator scale is defined on an annular scale plate 115 which is secured, as by gluing, to bezel 100. Pointer 30 is connected to the upper end of inner indicator input shaft 32 by a suitable coupling hub 116 and cooperates with dial 28 as shown in FIG. 4.

At a selected location along its periphery, preferably adjacent to the location on dial 29 where the zeros for the two scale indicia sequences thereof are aligned (see FIG. 3), the inner scale carrier 108 defines a finger 120 which extends radially outwardly from the periphery of the carrier toward but not to the inner surface of bezel 100. A projection 121 extends inwardly from the inner surface of bezel 100 below outer scale plate 115; preferably the projection is positioned below the point on the scale of dial 28 where one or the other of the two sets of aligned zeros for the two sets of scale indicia for dial 28 occur, and one of the zeros on the dial scale at such location is filled in to appear as a dot (see FIG. 3). The inner end of projection 121 is disposed closer to axis 26 than is the outer end of finger 120. Finger 120 and projection 121 have the same elevation above housing top surface 104. Accordingly, at some point in the rotation of bezel 100 about the indicator axis against the frictional coupling of the bezel to the housing, projection 121 will contact finger 120 of the inner scale carrier. Continued rotation of the bezel about the indicator axis will then cause the inner scale carrier to be rotated about axis 26 against the frictional coupling of the inner scale carrier to the housing. Thus, by appropriate rotation of bezel 100, first inner dial 29 can be rotated in either direction desired about the indicator axis to cause its scale to be zeroed or preset relative to the stationary position of indicator pointer 31. Then, by rotation of the bezel in the opposite direction, outer dial 28 can be zeroed or preset relative to the stationary indicator pointer 30. Dot 122 on dial 28 enables the user of the measuring device to know where projection 121 is located on the circumference on the bezel, thereby to facilitate rapid zeroing or presetting of the indicator. The user will readily learn that finger 120 is located adjacent to the zero location on dial 29.

The stiffness of the frictional couplings of inner scale carrier 108 and of bezel 100 to housing 11 is sufficiently great to prevent either of dials 28 or 29 from rotating about the indicator axis during normal use of the measuring device. These frictional clutch arrangements, however, are not sufficiently stiff that the indicator cannot readily be operated by the user in the manner described above.

A transparent crystal 125 is secured to bezel 100 to protectively enclose dials 28 and 29 and pointers 30 and 31, and yet still provide visual resort to indicator 27.

Finger 120 and projection 121 of the resettable indicator mechanism described above function to enable the inner and outer dials to be angularly driven about the indicator axis in a manner analogous to the way in which tumbler plates in a combination lock are driven in response to rotation of the lock dial in opposite directions.

In view of the foregoing description, it is apparent that this invention provides a reliable and efficient solution to the problem and the need identified above. The present indicator is compact, effective and simple to operate. It may be used in any application where multiple dials are called for to provide a desired measurement reading or other indication.

Workers skilled in the art to which this invention pertains will readily appreciate that modifications or alterations in the structure described above may be made without departing from the scope of this invention. The foregoing description is of a presently preferred embodiment of this invention, which embodiment is merely one form in which the principles and teachings of this invention may be applied. Accordingly, the preceding description should not be considered as limiting or restricting the scope of this invention.

What is claimed is:

1. A fully adjustable concentric dial indicator comprising a first annular scale member adapted to carry indicia around the periphery thereof defining a first circular scale, a second circular scale member disposed coaxially of the first scale member and adapted to carry indicia around the periphery thereof defining a second circular scale, friction clutch means coupling the scale members to a support for selective rotation of the scale members relative to the support in either direction about their common axis and including a manually engageable ring member to which only the first of the scale members is fixed and rotatable about said axis against the effect of the friction clutch means associated with the first scale member, first and second concentric rotatable shafts aligned with said axis and respectively carrying first and second pointers for cooperation in response to rotation of the shafts with scales definable on the respective ones of the scale members, a projection extending in one direction relative to said axis from the ring member, and a finger coupled to the second scale member and extending in an opposite direction therefrom relative to said axis into the path along which the projection moves in response to rotation of the ring member about said axis.

2. An indicator according to claim 1 wherein the indicator includes a single projection and a single finger.

3. An indicator according to claim 2 wherein the first and second scale members each carry said scale defining indicia, and each of the first and second scales has an origin, and wherein the projection and the finger are located adjacent the origins of the first and second scales, respectively.

4. An indicator according to claim 1 wherein the first scale member carries an indicium indicative of the position of the finger relative to the first scale member.

5. An indicator according to claim 1 including a carrier member disposed concentrically about the shafts and to which the second scale member is mounted, the finger being defined by the carrier member.

6. An indicator according to claim 5 wherein the clutch means includes post means raised from the support for slidably engaging the carrier member, and spring means coupled to the carrier member for relative rotation therebetween and urging the carrier member into slidable engagement with the post means.

7. An indicator according to claim 1 wherein the indicator is a component of a friction wheel distance measuring device.

8. An indicator according to claim 1 including drive means coupled to shafts for rotating the same.

9. An indicator according to claim 8 wherein the drive means is arranged to rotate one shaft a plural number of times for each rotation of the other shaft.

10. An indicator according to claim 1 wherein the second scale member has a diameter less than that of the first.

11. An indicator according to claim 1 wherein the projection extends inwardly toward the axis from the ring member.

* * * * *